O. B. WEIR & G. W. POWERS.
METHOD OF MAKING BROOMS.
APPLICATION FILED DEC. 13, 1916.
1,263,172.
Patented Apr. 16, 1918.
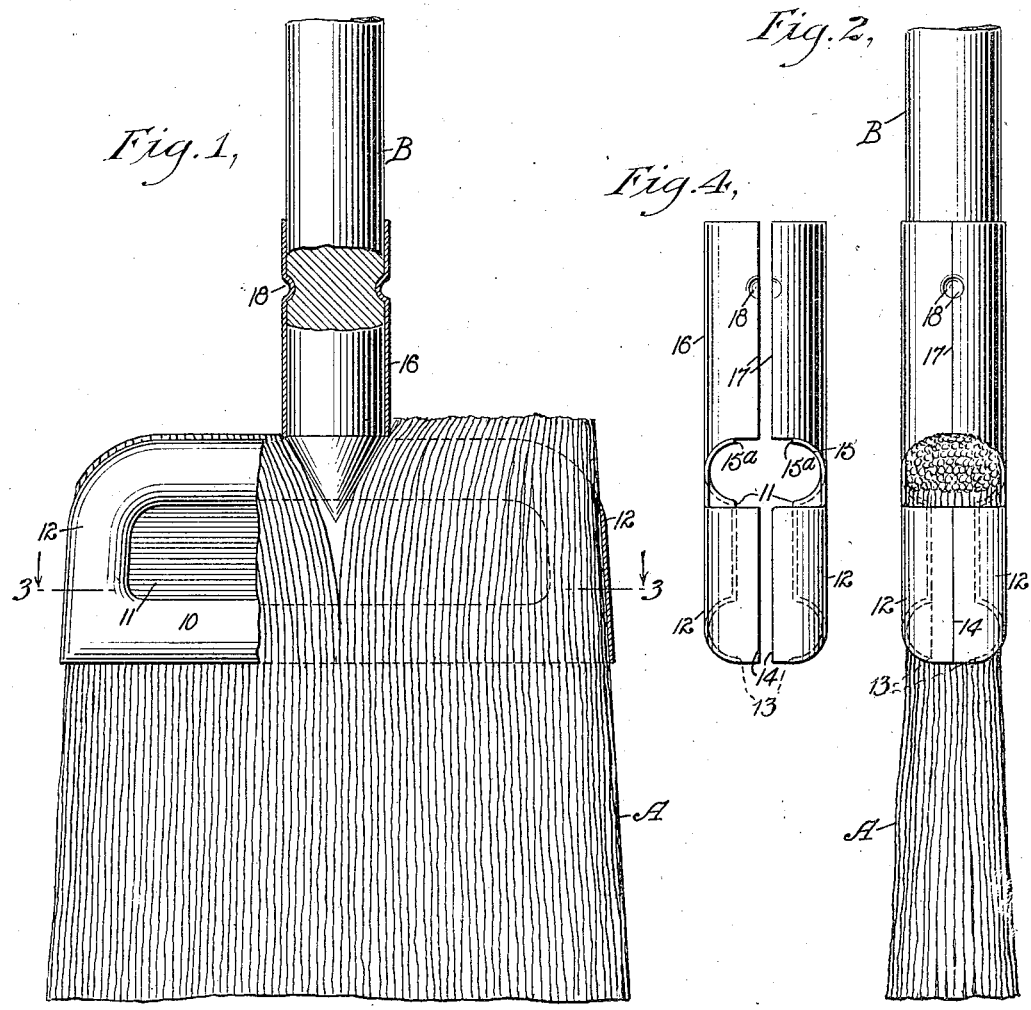
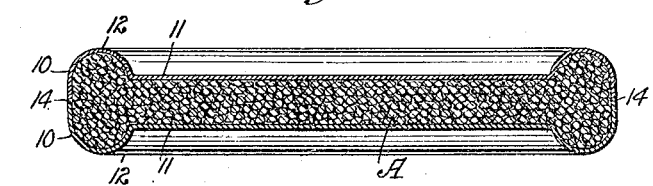
WITNESSES
Edw. Thorpe
J. L. Wardiff
INVENTORS
Oscar B Weir
George W. Powers
BY
ATTORNEYS

UNITED STATES PATENT OFFICE.

OSCAR B. WEIR AND GEORGE W. POWERS, OF PLATTSBURG, NEW YORK.

METHOD OF MAKING BROOMS.

1,263,172.  Specification of Letters Patent.  Patented Apr. 16, 1918.

Application filed December 13, 1916. Serial No. 136,594.

*To all whom it may concern:*

Be it known that we, OSCAR B. WEIR and GEORGE W. POWERS, citizens of the United States, and residents of Plattsburg, in the county of Clinton and State of New York, have invented a new and Improved Method of Making Brooms, of which the following is a full, clear, and exact description.

Our invention relates to brooms provided with metal shields or clamps for the broom head.

The invention has in view to form an essentially seamless and homogeneous clamp from separate clamp sections which will provide a substantial socket for the handle and have effective clamping engagement with the latter, in addition to its clamping and protective relation to the broom corn or other broom material; and to provide a method for producing a welded broom head clamp and handle socket, whereby the clamping of the broom head, the welding of the clamp, the insertion and securing of the broom handle, and the formation of the handle socket may be carried out with facility and despatch and without appreciably charring the broom corn.

Reference is to be had to the accompanying drawings forming a part of this specification in which similar reference characters indicate corresponding parts in all the views.

Figure 1 is a partly sectional side elevation of a broom head having the clamp and handle socket formed and secured in accordance with our invention;

Fig. 2 is an edge view;

Fig. 3 is a horizontal section on the line 3—3, Fig. 1;

Fig. 4 is a separate edge view of the clamp sections before being applied to the broom material and handle and welded.

We have discovered that a seamless metallic hood made up of separate sections may be incorporated in a broom head in gripping relation to the broom material and the sections welded in position, without materially charring or injuring the broom material, by forming plain butt joints on the sections and welding the same while under compression against the broom material, the form of the plain butt joints giving a minimum mass to acquire a heated condition and enabling the sheet material, because of the minimized heated mass, to dissipate, by conduction and radiation, the heat generated by the welding with an effectiveness that prevents damage to the broom corn by the welding heat.

In carrying out our invention in practice, the clamp or protector is made of any suitable sheet metal stamped in the form of two half sections that are a counterpart of each other. The sections, designated generally by the numeral 10, are formed of similar sheet metal plates and jointly are adapted to embrace the broom material A which may consist of broom corn, fibers, or other material usually employed. Each clamp section is formed with a broad central depressed panel 11 and with a border 12 which is semi-circular or approximately so in cross section. The border 12 extends across the bottom of each section 10 below the panel 11 and upwardly along the side edges, to or near to the top or shoulders of the broom material.

The depressed panels 11 are adapted to be pressed tightly against the broom material A at the opposite sides. The transverse opposed bottom edges 13 of the border members 12 are sufficiently outward from the opposed side edges 14 of the respective plates 10 that the said bottom thus will lie close against the broom material A in the planes of the panels 11 or approximately so, while the side edges 14 are so disposed as to be brought into close engagement and united by electric welding.

At the top the clamp sections 10, at each side of the center, that is to say, at the shoulders of the broom head, are formed with inwardly disposed members 15 which preferably are semi-circular in cross section and continuous with the semi-circular border members 12. The opposed edges 15ª of the top members 15, as best seen in Fig. 4, are outward from the line of the side edges 14 so as to provide an opening between said edges 15ª when the clamp sections are brought together.

Integral with the plates forming the sections 10 are members adapted to form a tubular socket or ferrule for the handle B. The said ferrule is formed of two members 16 semi-circular in cross section, rising from the respective sections 10 at the center. The members 16 present opposed vertical side edges 17 continuous, so positioned as to be brought together in line or substantially in line with the side edges 14.

In practice, two of the sections 10 are properly positioned in a press with the broom material A therebetween, said material being simply tied with a string to hold the assembled fibers. The clamp sections are then subjected to a substantial pressure to bring the opposed side edges 14 into contact. While the side edges 14 are thus under strong pressure, the said edges are welded together, preferably by the electric welding method. The edges 17 of the handle socket, while they are also subjected to pressure, are not at this time welded, nor is the handle B in place in the preferred manner of carrying out our method. The butts of the broom corn or fibers will be uneven and will protrude more or less through the openings provided between the edges 15$^a$. By reason of the formation of the clamp sections, the high heat developed at the meeting edges 14 is radiated so effectively that the material A is not charred or, in any event, will not be charred to a degree to damage the material and we particularly find it possible to carry out the electric welding process without damage to the said material.

The broom head with the clamp sections now welded at the sides is removed from the press and the handle B which preferably is tapered at its front end is inserted in the socket 16, the members of said socket being sprung apart and permitting the handle to be freely entered and properly forced into the broom head to wedge and spread the fibers thereof. The broom is now placed in a second press which usually is smaller than the first, since only the handle socket is to be considered. The second press causes the socket members 16 to be brought together and the side edges 17 placed under pressure; while in this position the edges 17 are welded together.

The handle socket may be produced with depressions 18 so that the press will indent the handle and interlock the depressed portions 18 with the handle. The butts of the corn or fibers protruding through the opening between the edges 15$^a$ are trimmed off with a saw and this operation may be done after the handle socket is welded or before the handle is inserted.

Our improved method results in a broom having a unitary and homogeneous clamp and protector which very effectively binds the broom corn because having been placed thereon under pressure. The protector is free from all projecting members that would catch on machinery or other outside bodies and the handle is very securely and rigidly retained in position.

Having thus described our invention we claim as new and desire to secure by Letters Patent:

In the method of manufacturing brooms, producing sheet metal front and back clamp sections having integral handle-socket members at the center, and with opposed edges on the socket members and on the sides of the sections below the top adapted to lie in close relation when the sections are brought together as well as with top members presenting openings between the socket members and the said side edges, applying the said sections to the broom material at the front and back surfaces of the broom head with the butts of the broom material projecting through the said openings, subjecting the said sections to pressure to bring the said side edges together, welding the said side edges, relieving the pressure on the sections, inserting a handle between the socket members, subjecting the sections again to pressure to bring the socket members into close relation, welding the said socket members, and trimming the butts of the broom material at the said openings close to the said top members.

OSCAR B. WEIR.
GEORGE W. POWERS.